United States Patent
Connelly et al.

(10) Patent No.: US 11,810,774 B2
(45) Date of Patent: Nov. 7, 2023

(54) FIELD EMISSION DEVICES

(71) Applicant: US Govt as represented by Secretary of Air Force, Kirtland AFB, NM (US)

(72) Inventors: Joseph M. Connelly, Albuquerque, NM (US); John R. Harris, Albuquerque, NM (US); John W. Lewellen, Albuquerque, NM (US)

(73) Assignee: Government of the United States as represented by the Secretary of the Air Force, Kirtland AFB, NM (US)

( * ) Notice: Subject to any disclaimer, the term of this patent is extended or adjusted under 35 U.S.C. 154(b) by 280 days.

(21) Appl. No.: 17/458,158

(22) Filed: Aug. 26, 2021

(65) Prior Publication Data

US 2022/0068584 A1 Mar. 3, 2022

Related U.S. Application Data

(60) Provisional application No. 63/070,825, filed on Aug. 26, 2020.

(51) Int. Cl.
*H01J 9/02* (2006.01)

(52) U.S. Cl.
CPC ......... *H01J 9/025* (2013.01); *H01J 2209/012* (2013.01)

(58) Field of Classification Search
CPC ....................................... H01J 9/025
USPC ........................................... 445/51
See application file for complete search history.

(56) References Cited

U.S. PATENT DOCUMENTS

| | | | |
|---|---|---|---|
| 3,453,478 A | | 7/1969 | Shoulders et al. |
| 3,921,022 A | | 11/1975 | Levine |
| 4,143,292 A | | 3/1979 | Hosoki et al. |
| 5,089,292 A | | 2/1992 | MaCaulay et al. |
| 5,578,901 A | | 11/1996 | Blanchet-Fincher et al. |
| 5,973,444 A | | 10/1999 | Xu et al. |
| 6,020,677 A | | 2/2000 | Blanchet-Fincher et al. |
| 8,659,217 B2 | | 2/2014 | Kim et al. |
| 11,043,349 B1 | * | 6/2021 | Roper ................. H01J 1/304 |
| 2004/0036402 A1 | | 2/2004 | Keesmann et al. |
| 2013/0150696 A1 | | 6/2013 | Han et al. |
| 2015/0270089 A1 | | 9/2015 | Ghanea-Hercock |
| 2020/0357595 A1 | * | 11/2020 | Velásquez-García ................. H01J 1/3042 |
| 2023/0133255 A1 | * | 5/2023 | Zeng ................. B22F 12/41 250/310 |

FOREIGN PATENT DOCUMENTS

KR 2018005868 A * 1/2018 ............ H01J 1/3046

OTHER PUBLICATIONS

Yang, Haipeng et al., "3-D Printed Adjustable Microelectrode Arrays for Electrochemical Sensing and Biosensing,". Sens Actuators B Chem. Jul. 2016 ; 230: 600-606. doi: 10.1016/j.snb.2016.02.113.

(Continued)

*Primary Examiner* — Christopher M Raabe
(74) *Attorney, Agent, or Firm* — David L. Narciso; AFNWC/JA

(57) ABSTRACT

A method for making field emission devices so that they have emitter tips in the form of a needle-like point with a width and length configured such that ratio of the width to the length ranges from about 0.001 to about 0.05, and associated methods for making the tips by 3-D printing.

20 Claims, 2 Drawing Sheets

(56) References Cited

OTHER PUBLICATIONS

Roberts, Robert C. et al., "3D Printed Stainless Steel Microelectrode Arrays," Transducers, pp. 1233-1236, Jun. 18-22, 2017.
Tang, Wilkin et al., "Experimental study of electric field screening by the proximity of two carbon fiber cathodes," Journal of Vacuum Science & Technology B, vol. 30, 061803 (2012).
Tang, Wilkin W. et. al., "Field emission study of small number of carbon fiber field emitters," 2017 Eighteenth International Vacuum Electronics Conference (IVEC), London, UK, 2017, pp. 1-3, doi: 10.1109/IVEC.2017.8289654.
Harris, J.R., et al., "Practical considerations in the modeling of field emitter arrays with line charge distributions," Journal of Applied Physics vol. 121, 203303 (2017).
Saleh, Mohammad Sadeq, et al., "CMU Array: A 3D Nano-Printed, Customizable Ultra-High-Density Microelectrode Array Platform," http://dx.doi.org/10.1101/742346, Aug. 21, 2019.
Perales-Martinez, Imperio Anel, et al., "Fully 3D-printed carbon nanotube field emission electron sources with in-plane gate electrode," Nanotechnology 30 (2019) 495303.
Foo, Chuan Yi, et al., "Three-Dimensional Printed Electrode and Its Novel Applications in Electronic Devices," Scientific Reports, (2018) 8:7399, DOI:10.1038/s41598-018-25861-3.

\* cited by examiner

FIELD EMISSION DEVICES

GOVERNMENT INTEREST

The invention described herein may be manufactured and used by or for the Government of the United States for all governmental purposes without the payment of any royalty.

FIELD OF THE INVENTION

This invention relates to the field of field emission devices (FEDs). More particularly, this invention relates to the fabrication of FEDs to provide FEDs having needle-like points and providing FEDs by 3-D printing.

BACKGROUND OF THE INVENTION

Improvement is desired in the manufacture of FED structures. In particular, a current challenge is how to produce large-area field emitter arrays of closely-spaced, large aspect ratio (long, thin, sharp) emitter tips, and to do so in a cost and time efficient manner.

It is desirable to provide FED devices having emission surfaces configured as a needle-like point. The needle-like points desirably enhance the applied field, resulting in higher current densities at lower applied voltages and other advantages.

The present invention advantageously improves over the art and provides cost and time efficient techniques for manufacture of improved FED structures, and in particular field emitter arrays having large-area arrays of closely-spaced, large aspect ratio emitter tips.

SUMMARY OF THE INVENTION

The above and other needs are met by methods for making field emission devices having emitter tips in the form of a needle-like point with a width and length configured such that ratio of the width to the length of the emitter tip ranges from about 0.001 to about 0.05. Preferred methods utilize 3-D printing in the provision of the field emission devices.

In one aspect, a method according to the disclosure includes the steps of providing an emitter tip by 3-D printing. The emitter tip has a width and a length. The method also includes the step of configuring the emitter tip during printing such that the ratio of the width of the emitter tip to the length of the emitter tip ranges from about 0.001 to about 0.05.

In a further aspect, a method according to the disclosure includes the steps of providing an array of emitter tips; and coating portions of the emitter tips with a conductive material such that the conductive material is deposited onto the emitter tips in a sharp tip configuration in the form of a needle-like point with a width and length configured such that ratio of the width to the length ranges from about 0.001 to about 0.05.

In another aspect, a method according to the disclosure includes the steps of providing an array of emitter tips; and coating portions of the emitter tips with a conductive material. The coating is accomplished by depositing the conductive material onto the emitter tips from one side only of the emitter tips at an angle of from about 30 degrees to about 60 degrees relative to the length axis of the emitter tips, In this manner the conductive material is deposited onto the emitter tips in a sharp tip configuration in the form of a needle-like point with a width and length configured such that the ratio of the width to the length ranges from about 0.001 to about 0.05.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION OF THE INVENTION

In one aspect, the disclosure relates to fabrication of field emission devices (FEDs) by additive manufacturing processes (3-D printing). In particular, the invention is utilized in the fabrication of FEDs with field emission cathodes having needle-like points or arrays having needle-like emitters. In this has been discovered that 3-D printing techniques may advantageously be utilized to provide field emission structures having needle-like points or arrays having needle-like emitters, and that such may be accomplished in a cost and time efficient manner.

As used herein, the terms needle-like point and needle-like emitters refers to a field emission structures including cathodes or other emitters having a high aspect ratio in which the ratio of the width of the cathode or emitter or other FED structure to its length ranges from about 0.001 to about 0.05. For example, for the described embodiments the widths of the cathodes or emitters have a width W that preferably ranges from about 5 microns to about 50 microns, with a corresponding length L of from about 1 mm (1,000 microns) to about 5 mm (5,000 microns). Thus, a high aspect ratio in accordance to the disclosure is a structure having a width/length ratio of about 0.001 (5 microns/5,000 microns) to about 0.05 (50 microns/1,000 microns). As will be noted, the emitters depicted herein may be of substantially uniform width or thickness or they may be tapered or otherwise nonuniform. In the case of tapered or nonuniform emitters, the width W corresponds to the average width of the emitter.

Virtually any 3-D printing process may be used in accordance with the disclosure. Preferred 3-D printing processes include nozzle-based processes, such as fused deposition modeling and inkjet printing, and light-based and electron-beam-based processes, such as stereolithography and selective sintering.

It will be appreciated that a variety of materials may be utilized with the 3-D printing processes to achieve the desired structures. Examples of materials for use with nozzle-based 3-D printing processes include conductive materials, such as carbons (graphite, graphene, and carbon nanotubes) and metals (aluminum, copper, silver) which can be mixed with the thermoplastics and photopolymers commonly used in 3-D printing to yield improved field emission devices according to the disclosure. Examples of materials for use with stereolithography 3-D printing include powders of nylon, graphite-infused nylon, and aluminum-infused nylon. For selective sintering 3-D printing, conductive resins with graphene and copper additives are preferred.

Figure 1A:
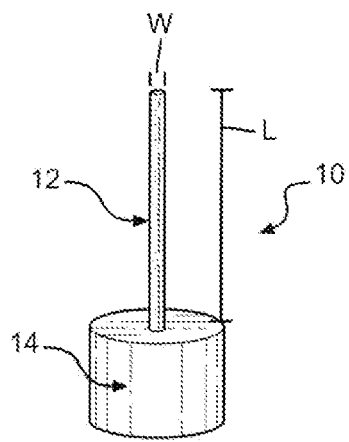
FIGS. 1A and 1B show a FED fabricated by 3-D printing according to one embodiment of the disclosure.
Figure 1B:
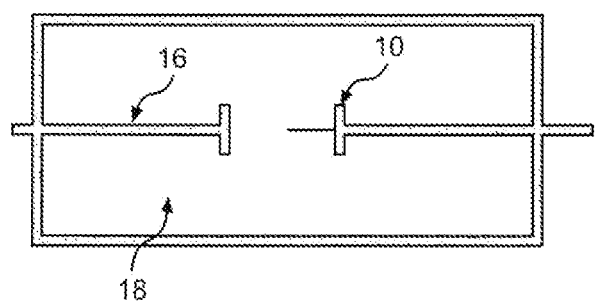

With initial reference to FIG. 1A, there is shown a single-emitter cathode 10, fabricated by 3-D printing and having a single emitter 12 configured as a needle-like point, attached to a stand 14. FIG. 1B shows the cathode 10 utilized in a field emission device having the cathode 10 and a grounded anode 16 sealed in a vacuum chamber 18. In use of the field emission device, a large negative voltage is applied to the cathode 10 and electrons are emitted toward the grounded anode 16.

Figure 2:
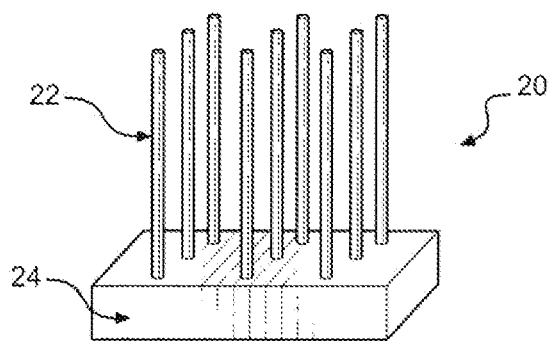
FIG. 2 shows another embodiment of a FED fabricated by 3-D printing and having needle-like emitters printed directly onto a stand.

In another aspect, the disclosure relates to arrays of field emission cathodes having needle-like points. With reference to FIG. 2, there is shown an emitter-array cathode 20, fabricated by 3-D printing and having a 3×3 array of needle-like emitters 22 printed directly onto a stand 24.

While the array is shown in FIG. 2 as configured as identical cylindrical emitters uniformly spaced apart, it will be appreciated that in the array the emitters 22 may not be identical to one another and may be otherwise positioned to be non-uniform. For example, instead of generally cylindrical the emitters may be tapered, flat, convex, concave, or otherwise configured. Also, the positioning may be arbitrary, in triangular, hexagonal, or circular patterns or other arrangements. This is likewise the case for the other emitters and arrays shown and described herein.

Figure 3:
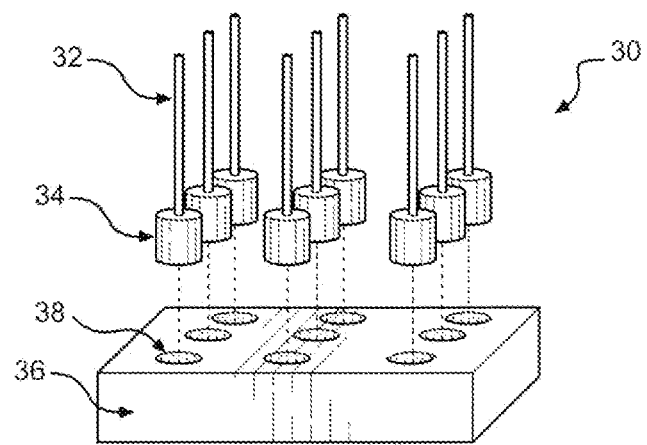
FIG. 3 shows a further embodiment of a FED fabricated by 3-D printing and having a plurality of single-emitters having stands inserted into an array stand having receivers into which into which the stands are inserted.

In another aspect, as shown in FIG. 3, there is shown an emitter-array cathode 30, fabricated by 3-D printing and having a plurality of single-emitters 32 having stands 34 inserted into an array stand 36 having receivers 38 into which into which the stands 34 are inserted.

Figure 4A:
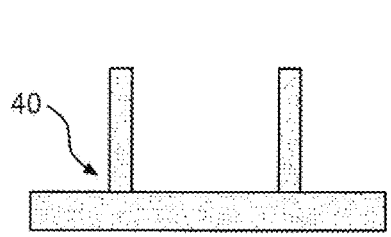
FIGS. 4A and 4B shows yet another embodiment of a FED fabricated by 3-D printing and having an array of emitter tips over-coated with a conductive material.
Figure 4B:
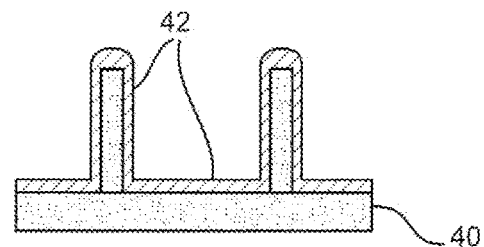

The foregoing described emitters 12, 22, and 32 may be printed of a conductive material. Alternatively, as shown in FIG. 4A, an array of emitter tips 40 may be printed of a non-conductive material and over-coated with a conductive material 42, as shown in FIG. 4B.

Figure 5A:
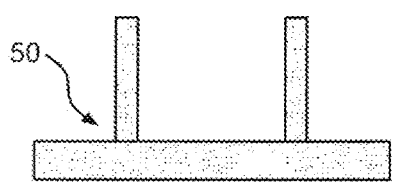
FIGS. 5A and 5B show still another embodiment of a FED fabricated by 3-D printing and having an array of emitter tips over-coated with a conductive material applied nonuniformly to provide the conductive material in a desired sharp tip configuration.
Figure 5B:
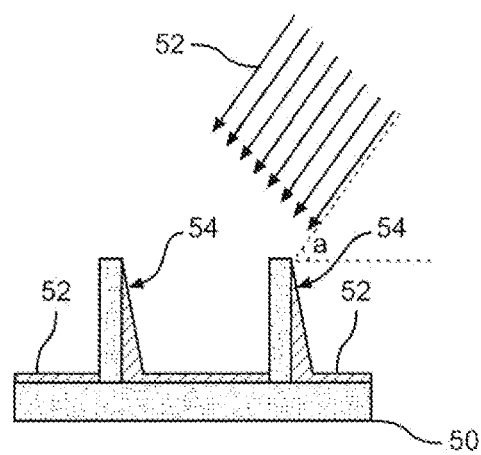

In another embodiment, an array of emitter tips 50 is printed, as shown in FIG. 5A and coated with a conductive material 52 as shown in FIG. 5B. As depicted in FIG. 5B, the coating of the conductive material 52 is applied nonuniformly, for example by depositing as by spraying or depositing from one side only at an angle a of from about 30 degrees to about 60 degrees, most preferably about 40 to about 50 degrees, to provide the conductive material 52 in a desired sharp tip configuration 54 in the form of a needle-like point with a width and length configured such that ratio of the width to the length ranges from about 0.001 to about 0.05. It will be appreciated that this embodiment the initial tips 50 may be otherwise provided and need not be made by 3-D printing, as it is the coating technique that provides the desired sharp tip configuration.

Figure 6A:
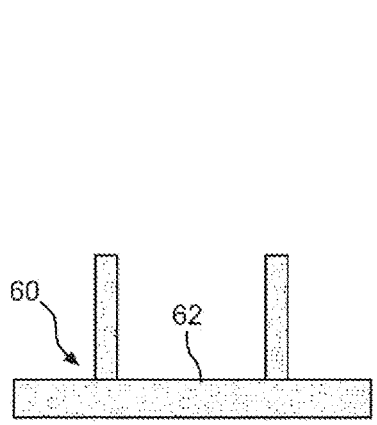
FIGS. 6A, 6B and 6C show an additional embodiment of a FED fabricated by 3-D printing and having an array of emitter tips made of a soluble material, and over-coated with a conductive material, after which portions of the soluble material are removed leaving behind only the conductive material in a desired sharp tip configuration.
Figure 6B:
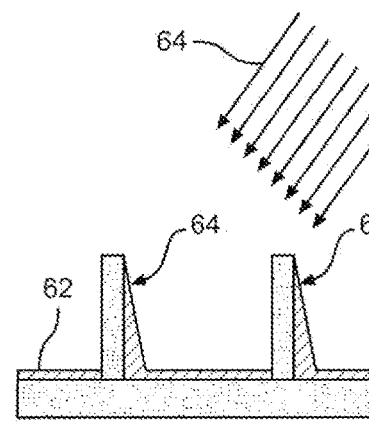
Figure 6C:
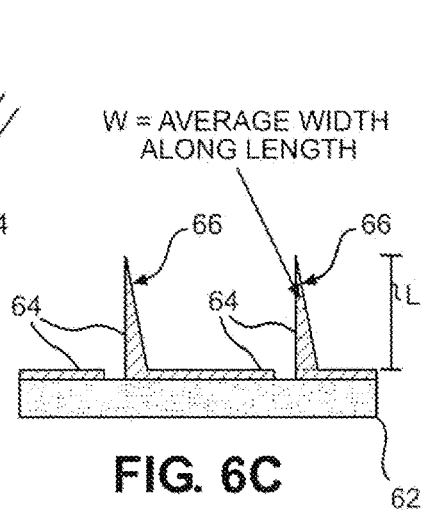

In another embodiment, an array of emitter tips 60 is printed from a soluble material 62, as shown in FIG. 6A and coated with a conductive material 64 as shown in FIG. 6B by spraying from one side only at an angle of from about 30 degrees to about 60 degrees, to provide the conductive material 64 in a desired sharp tip configuration in the form of a needle-like point with a width and length configured such that ratio of the width to the length ranges from about 0.001 to about 0.05. Following this, as shown in FIG. 6C, portions of the soluble material 62 are removed leaving behind only the conductive material 64, which provides an array of emitter tips in a desired sharp tip configuration 66. It will be appreciated that this embodiment the initial tips 60 made from the soluble material 62 may be otherwise provided and need not be made by 3-D printing, as it is the coating technique and removal of the soluble material that provides the desired sharp tip configuration.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A method for making a field emission device, comprising the steps of:
   providing an array of emitter tips; and
   coating portions of the emitter tips with a conductive material by depositing the conductive material onto the emitter tips from one side only of the emitter tips at an angle of from about 30 degrees to about 60 degrees relative to the length axis of the emitter tips such that the conductive material is deposited onto the emitter tips in a sharp tip configuration in the form of a needle-like point with a width and length configured such that the ratio of the width to the length ranges from about 0.001 to about 0.05.

2. The method of claim 1, wherein the array of emitter tips is formed by 3-D printing.

3. The method of claim 2, wherein the 3-D printing is performed by one or more of fused deposition modeling, inkjet printing, stereolithography, and selective sintering.

4. The method of claim 2, wherein the array of emitter tips formed by 3-D printing is made from one or more of carbon, metal, powder of nylon, graphite-infused nylon, aluminum-infused nylon and conductive resin.

5. The method of claim 1, wherein in the array the emitters are identical to one another.

6. The method of claim 1, wherein in the array the emitters are uniformly spaced apart.

7. The method of claim 1, wherein in the array the emitters are not identical to one another.

8. The method of claim 1, wherein in the array the emitters are not uniformly spaced apart.

9. The method of claim 1, wherein the step of providing the array of emitter tips comprises providing the array of emitter tips from a soluble material, and the method further includes a step of removing portions of the soluble material after the step of coating portions of the emitter tips with a conductive material.

10. A method for making a field emission device, comprising the steps of:
   providing an array of emitter tips; and
   coating portions of the emitter tips with a conductive material such that the conductive material is deposited onto the emitter tips in a sharp tip configuration in the form of a needle-like point with a width and length configured such that ratio of the width to the length ranges from about 0.001 to about 0.05.

11. The method of claim 10, wherein the array of emitter tips is formed by 3-D printing.

12. The method of claim 11, wherein the 3-D printing is performed by one or more of fused deposition modeling, inkjet printing, stereolithography, and selective sintering.

13. The method of claim 11, wherein the array of emitter tips formed by 3-D printing is made from one or more of carbon, metal, powder of nylon, graphite-infused nylon, aluminum-infused nylon and conductive resin.

14. The method of claim 10, wherein in the array the emitters are identical to one another and uniformly positioned.

15. The method of claim 10, wherein in the array the emitters are not identical to one another.

16. The method of claim 10, wherein in the array the emitters are not uniformly positioned.

17. A method for making a field emission device, comprising the steps of:
   providing an emitter tip by 3-D printing, wherein the emitter tip has a width and a length; and
   configuring the emitter tip during printing such that the ratio of the width of the emitter tip to the length of the emitter tip ranges from about 0.001 to about 0.05.

18. The method of claim 17, wherein the step of providing an emitter tip comprises providing an array of emitter tips with the ratio of the width to the length of each of the emitter tips ranging from about 0.001 to about 0.05.

19. The method of claim 17, wherein the 3-D printing is performed by one or more of fused deposition modeling, inkjet printing, stereolithography, and selective sintering.

20. The method of claim 17, wherein the emitter tip is made from one or more of carbon, metal, powder of nylon, graphite-infused nylon, aluminum-infused nylon and conductive resin.

* * * * *